United States Patent
Cromer et al.

(10) Patent No.: US 7,218,944 B2
(45) Date of Patent: May 15, 2007

(54) FREQUENCY BEACON TO BROADCAST ALLOWED FREQUENCY

(75) Inventors: Daryl Carvis Cromer, Apex, NC (US); Philip John Jakes, Durham, NC (US); Howard Jeffrey Locker, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/103,300

(22) Filed: Mar. 21, 2002

(65) Prior Publication Data

US 2003/0181215 A1    Sep. 25, 2003

(51) Int. Cl.
  *H04B 7/00*   (2006.01)
  *H04Q 7/20*   (2006.01)
(52) U.S. Cl. .............. 455/515; 455/11.1; 455/41.2; 455/435.2; 455/439; 455/465; 370/338
(58) Field of Classification Search ............... 455/515, 455/465, 435.2, 11.1, 41.2, 432.1, 41.1, 439, 455/899; 370/338, 348; 709/220, 221
See application file for complete search history.

(56) References Cited

U.S. PATENT DOCUMENTS

| 5,598,459 | A | 1/1997 | Haartsen |
| 5,611,050 | A | 3/1997 | Theimer et al. |
| 5,659,617 | A | 8/1997 | Fischer |
| 5,815,811 | A | 9/1998 | Pinard et al. |
| 6,542,740 | B1* | 4/2003 | Olgaard et al. ......... 455/432.1 |
| 6,628,938 | B1* | 9/2003 | Rachabathuni et al. .. 455/456.3 |
| 6,750,883 | B1* | 6/2004 | Parupudi et al. ............ 715/763 |
| 6,782,253 | B1* | 8/2004 | Shteyn et al. ............. 455/414.1 |
| 6,795,688 | B1* | 9/2004 | Plasson et al. ............. 455/41.2 |
| 6,901,066 | B1* | 5/2005 | Helgeson .................... 370/348 |
| 2002/0022483 | A1* | 2/2002 | Thompson et al. ......... 455/439 |

FOREIGN PATENT DOCUMENTS

WO    WO 00/49827    8/2000

* cited by examiner

*Primary Examiner*—Nay Maung
*Assistant Examiner*—Shaima Q. Aminzay
(74) *Attorney, Agent, or Firm*—David Irvin; Dillon & Yudell LLP

(57) ABSTRACT

A wireless communication network comprising: (1) a plurality of mobile devices each configured to receive a beacon being broadcasted within the network and determine based on information transmitted within the beacon whether the mobile device is supported within the network; and (2) one or more access devices configured to broadcast the beacon within the network. Each of the mobile devices has a transmitting mechanism for communicating with the one or more access device. However, only those mobile devices that are supported by the network respond to the receipt of the beacon. Thus, no transmission occurs from the mobile devices until the device is identified as being supported by the network. These mobile devices instantiating a communication path with the one or more access devices and request an authentication from the one or more access devices. In this manner, a handshake mechanism is established between the access devices and the mobile devices that are supported by the network. Unnecessary requests from illegal mobile devices that clutter up the air waves when attempting to establish a handshake within networks with which they are not compatible is substantially eliminated.

28 Claims, 6 Drawing Sheets

FREQUENCY BEACON TO BROADCAST ALLOWED FREQUENCY

BACKGROUND OF THE INVENTION

1. Technical Field

The present invention relates generally to wireless networks and in particular to authorization handshakes between client devices and access points of wireless networks. Still more particularly, the present invention relates to a method and system for reducing interference from transmissions on the airwaves of an authentication request from a client device that is not authorized to operate within the particular network frequency range.

2. Description of the Related Art

A typical cellular communications system includes a number of fixed base stations (also known as access stations) interconnected by a cable medium often referred to as a system backbone. Also included in many cellular communications systems are intermediate base stations which are not directly connected to the system backbone but otherwise perform many of the same functions as the fixed access points. Intermediate base stations, often referred to as wireless base stations, increase the area within which base stations connected to the system backbone can communicate with mobile devices.

Associated with each base station is a geographic cell. The cell is a geographic area in which an access point has sufficient signal strength to transmit data and receive data from a mobile device such as a data terminal or telephone with an acceptable error rate. Typically, base stations will be positioned along the backbones such that the combined cell area coverage from each base station provides full coverage of a geographic area.

Mobile devices such as telephones, pagers, personal digital assistants (PDA's), data terminals, etc., are designed to be carried throughout the system from cell to cell. Each mobile device is capable of communicating with the system backbone via wireless communication between the mobile device and a base station to which the mobile device is registered. As the mobile device roams from one cell to another, the mobile device will typically de-register with the base station of the previous cell and register with the base station associated with the new cell. In order to provide sufficient cell area coverage, base station (or the antennas associated with each base station) within the cellular communications systems typically are distributed at separate physical locations throughout an entire geographic area.

The IEEE 802.11 standard has been adopted for wireless local area networks (WLANs) and has gained acceptance among the industrial, scientific and medical communities. The IEEE 802.11 standard for WLANs is a standard for systems that operate in the 2,400 to 2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems. The latest IEEE 802.11 wireless LAN uses a band of frequencies near 2.4 Ghz for direct sequence spread spectrum transmissions.

The primary type of WLAN currently in operation utilizes fixed network access points with which mobile terminals are able to communicate. The structure is very similar to present day cellular networks. IEEE 802.11 makes provisions for data rates of either 1 MBps, 2 Mbps, 5.5 Mbps, and 11 Mbps and calls for operation in the 2.4–2.4835 GHz frequency.

Wireless technology now reaches or is capable of reaching virtually every location on the face of the earth motivated in part by people's desire for increased mobility. Since wireless technology uses the air waves, frequencies are controlled by governmental regulatory bodies such as the FCC, CISPR, etc. These bodies have the responsibilities to approve frequency ranges and power levels for various products (i.e., providing homologation approval). Thus, a client device may be legal (i.e., supported within the approved frequency range) in one country and illegal (i.e., not supported within the approved frequency range) in another country. This information is important due to the relative ease with which the device may be activated in a country in which it is illegal. Operating the illegal device results in the device interfering with other devices operating within a particular country by promulgating signals that are not supported for that type of device and which may be utilized for other types of communication.

A fundamental problem with wireless technology is the handshake between the client device and the access point. Currently, client devices constantly search for an access point within range. In areas such as Europe and Latin America, where an individual may travel across country borders relatively frequently/easily, a device may be constantly transmitting a request for a handshake within a network located in another country that does not support that device. Since the legality of the device is based on homologation approval, the user merely assumes the device is not in range of an access point and does not consider the havoc being wreaked on the airwaves due to the constant transmissions of his device.

The present invention recognizes that it would be desirable to provide a method and system within a wireless network that switches the authorization negotiating scheme from the client devices to the access points to prevent a client device from continually broadcasting in countries in which it is not approved. A method and system that changes the discovery mechanism between access point and client device of the 802.11 protocol while reducing the amount of unapproved transmission outside of the homologated frequencies would be a welcomed improvement. It would be further desirable to provide both an access device and a client device that operated according to the new discovery mechanism. These and other benefits are provided by the invention as described herein.

SUMMARY OF THE INVENTION

Disclosed is a wireless communication network comprising: (1) a plurality of mobile devices each configured to receive a beacon being broadcasted within the network and determine based on information transmitted within the beacon whether the mobile device is supported within the network; and (2) one or more access devices configured to broadcast the beacon within the network. Each of the mobile devices have a transmitting mechanism for communicating with the one or more access device; however only those mobile devices that are supported by the network respond to the receipt of the beacon. These mobile devices instantiating a communication path with the one or more access devices and request an authentication from the one or more access devices. In this manner, a handshake mechanism is established between the access devices and the mobile devices that are supported by the network without unnecessary requests from illegal mobile devices cluttering up the air waves attempting to establish a handshake within networks with which they are not compatible.

In the illustrative embodiment, the beacon is made up of information identifying which frequency ranges, power levels, and channels are supported by the network. This information may be entered by a network administrator.

The invention includes modification of both the access devices and the mobile (i.e., client) devices. With respect to the client devices, the invention provides a method for authenticating the client devices within a wireless communication network without requiring the client devices to continually search (i.e., transmit requests) for authentication. The client device thus comprises: (1) a receiver that receives a broadcast of a beacon generated by one or more access devices of the network; (2) a mechanism that evaluates the beacon for characteristics indicating whether the client device is supported within the network; and (3) a mechanism that is responsive to the client device being supported within the network, transmits a request to the one or more access devices for authentication. Thus, rather than continually issuing requests for authentication, the client devices monitoring the airwaves for the beacon and evaluates the received beacon information to determine when to issue a request for authentication. The evaluation is completed by comparing the frequency ranges supported by the network with frequencies required for operation of the client device. The generation and issue of the request for authentication occurs only when at least one of the frequencies falls within the frequency ranges. According to one embodiment, the client device is set to a receiving mode during regular power on but is reset to a transmit mode when the client device enters a low power state.

The primary modification to the access device concerns the transmission of the beacon. Thus the access device comprises means for broadcasting, via a transmitter, a beacon indicating characteristics of the network utilized to determine which client devices among multiple possible types of client devices are supported by the network. The access device further includes an input mechanism by which a network administrator may enter the necessary information required for transmission in the beacon. According to the illustrative embodiment the network administrator enters information about which frequency ranges, power levels, and channels that are supported by the network. Once this information is made available the access device generates and transmits the beacon on a periodic basis. The actual period utilized maybe a parameter that is set within the algorithm which generates the beacon. The access device is linked to the other components of the network.

In addition to the mechanisms for generating and broadcasting the beacon, the access device further includes a receiver that receives transmissions of a request for authentication from one or more client devices located within the network. When these requests are received, the access device completes the authentication of the client device if the client device is supported by the network. Once the authentication is completed, the access device enables the client device to communicate over the network.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides a method and system within a wireless network in which the initiation of client device identification/authentication process to the network (via a network access device), which is traditionally completed via client device signaling is switched from the client device to the access device. Specifically, the access device is provided with mechanisms for generating and transmitting a beacon that is evaluated by each client device, which determines whether or not the client device is supported by the network. The authentication request is only completed when the client device is actually supported by the network.

The illustrative embodiments are described within a wireless system that employs the IEEE 802.11 standard. It should be understood, however, that the description of a particular type of network or protocol are merely illustrative and not meant to be a limitation on the invention.

Figure 1:
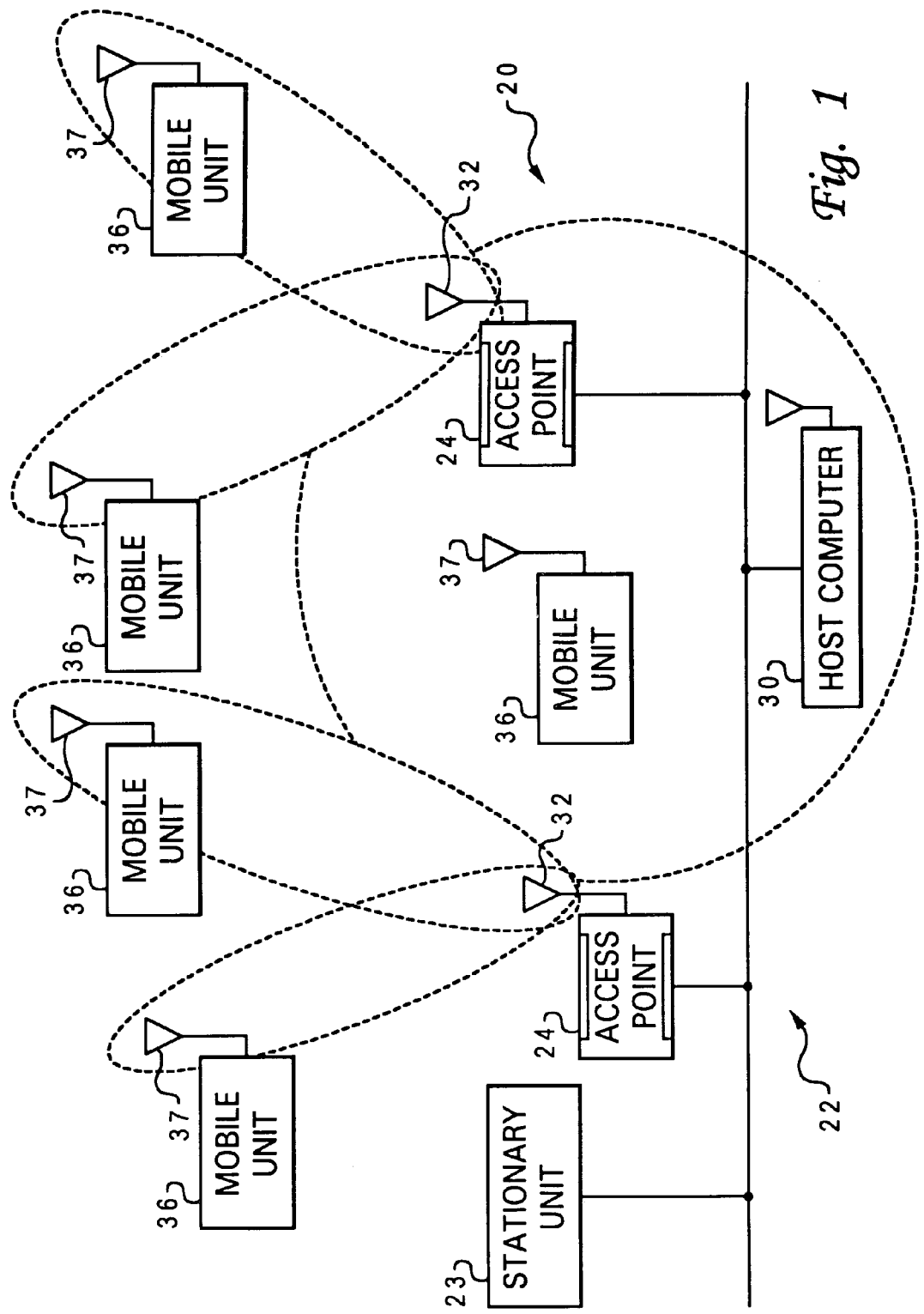
FIG. 1 illustrates a system diagram of a network communication system employing the IEEE 802.11 standard in accordance with the present invention.

Referring now to the figures and in particular to FIG. 1, there is illustrated a wireless communication system 20 employing the IEEE 802.11 standard. The cellular communication system 20 includes a local area network (LAN) 22. The LAN or network backbone 22 may be a hardwired data communication path made of twisted pair cable, shielded coaxial cable or fiber optic cable, for example, or may be wireless or partially wireless in nature. Coupled to the LAN 22 are several access points (or devices) 24. Access point 24 is shown hardwired (or physically connected) to the network backbone 22. Each access point 24 serves as an entrance point through which wireless communications may occur with the network backbone 22.

Each access point 24 is capable of wirelessly communicating with other devices in the communication system 20 via respective antennas commonly denoted by reference numeral 32. A geographic cell (not shown) associated with each access point 24 defines a region of coverage in which successful wireless communication may occur. Depending on the type of antenna 32 selected and output power of the respective access point, the geographic cell may take one of several different forms and sizes.

The wireless communication system 20 also includes one or more mobile communication units 36. The mobile communication units 36 each include an antenna 37 for wirelessly communicating with other devices. Each mobile communication unit 36 communicates with devices on the network backbone 22 via a selected access point 24 and/or with other mobile communication units, and/or upon roaming from one cell to another, the mobile communication unit 36 is configured to associate itself with a new access point 24. A mobile communication unit 36 registers with a particular access point 24 which provides the particular mobile communications unit with wireless access to the network backbone 22. Typically, access points 24 and mobile units 36 in different cells can communicate with each other during the same time period, such that simultaneous communication is occurring in system 20. The system 20 may conform to the IEEE standard 802.11 "Direct Sequence Spread Spectrum Physical Layer Specification". Alternatively, the system 20 may conform to utilizing the IEEE standard 802.11 "Frequency Hopping Spread Spectrum Physical Layer Specification" or any other protocol transmitting portions of packets at varying modulations and data rates.

The invention changes the discovery mechanism between access point and client devices of the 802.11 wireless protocol. Further, the invention provides a fundamental change to specification with respect to operation of 802.11 devices. This change impacts both the client device and the access point device. The change to the operation of the client device transmit features aids in preventing illegal operation in countries not homologated to that client device. For purposes of the invention the term "legal" refers to client devices that operate within the frequency range, power levels, and channels supported by the network, and the term "illegal" refers to client devices that do not operate within these parameters supported by the network.

Figure 2:
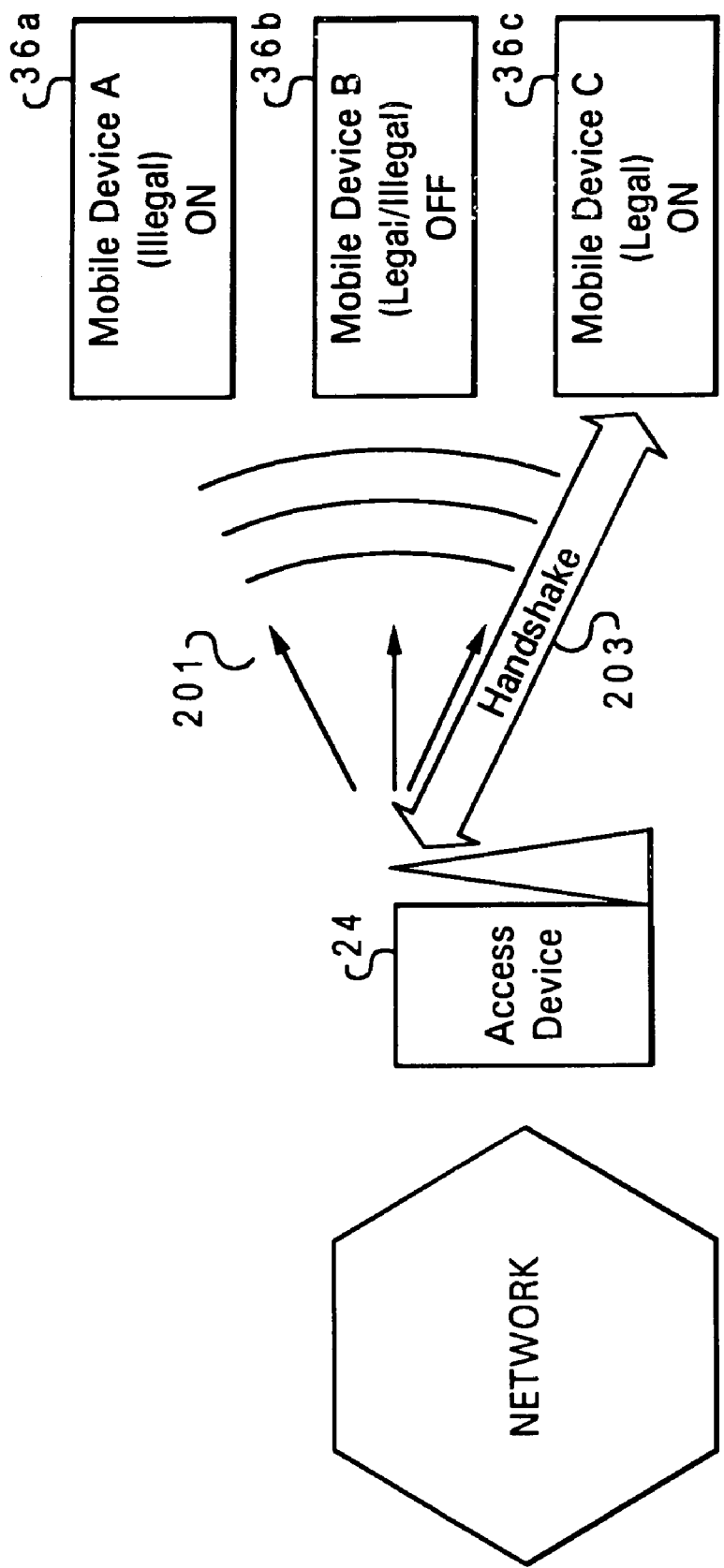
FIG. 2 is a block diagram representation of another wireless network similar to that of FIG. 1 within which the preferred embodiment of the invention may be implemented.

FIG. 2 provides a second illustration of a communication system 20, which has similar components and associated reference numerals to that of FIG. 1. FIG. 2 further illustrates the signaling which occurs between the representative access point 24 and multiple mobile devices 36a, 36b, and 36c, each having different operating characteristics. Thus, mobile device A 36a is powered on but is illegal within the network, mobile device B 36b is powered off and may be either legal/illegal since it is not transmitting or receiving any signals in the off state, and mobile device C 36c is powered on and is legal within the network. Each mobile device 36a, 36b, and 36c is initially in a receiving mode and the device does not transmit signals within the network until the device is made aware that it is a legal device for that network. A single beacon 201 (indicated by the waves and directional arrows) is transmitted from access device 24 (via antenna) to each mobile device 36a, 36b, and 36c. Mobile device C 36c, which is legal and ON, receives the beacon and responds by performing a handshake operation 203 with access device 24. As illustrated, handshake operation involves establishing a two way communication path between mobile device C 36c and access device 24.

Figure 3A:
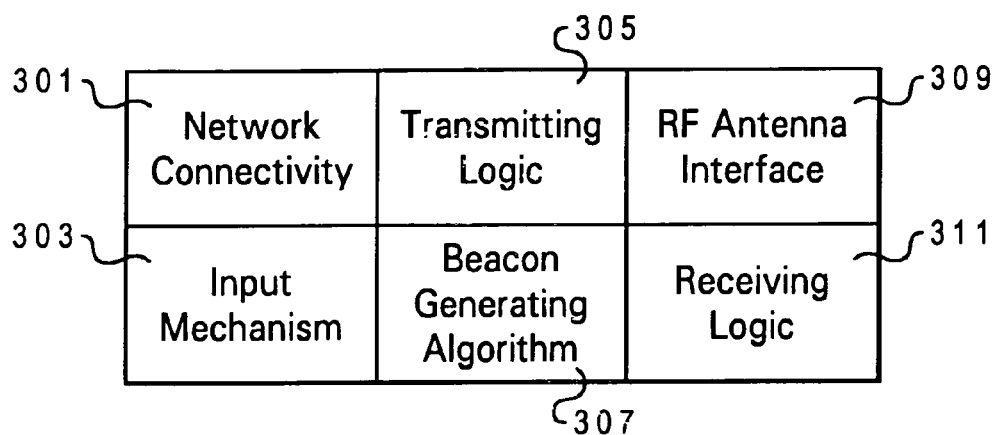
FIG. 3A illustrates the basic components of the access device of FIGS. 1 and 2 according to one embodiment of the present invention.

FIG. 3A is a block diagram illustrating the component parts of an access device 24 designed to implement the features of the invention. Typically, the access point device is a stationary device that is hardwired to the network infrastructure. As shown, access device 24 comprises basic components including network connectivity 301 by which access device 24 connects to the wireless network, transmitting logic 305, receiving logic 311, and antenna interface 309. Of course, the invention extends the functionality of these basic components, which interact with the other illustrated components of the access device. The invention makes the access point the focal of control for allowable frequencies. To enable this, the access point is also provided with a beacon generating algorithm 307 and an input mechanism 303 that enables the access point to be programmed by a network administrator with allowable frequency (e.g., 2.4 GHz, 5 GHz, etc)., allowable power (e.g., 10 mW, 30 mW, 100 mW), and allowable channels (e.g., channels 1–14). Notably, the approved values of the country of operation are programmed within the access point. The access point is programmed (i.e., beacon generating algorithm 307 is provided and executed) to send out a periodic beacon with the network operating parameters (frequency, power, channels) to enable new legal client devices to discover the network.

Figure 3B:
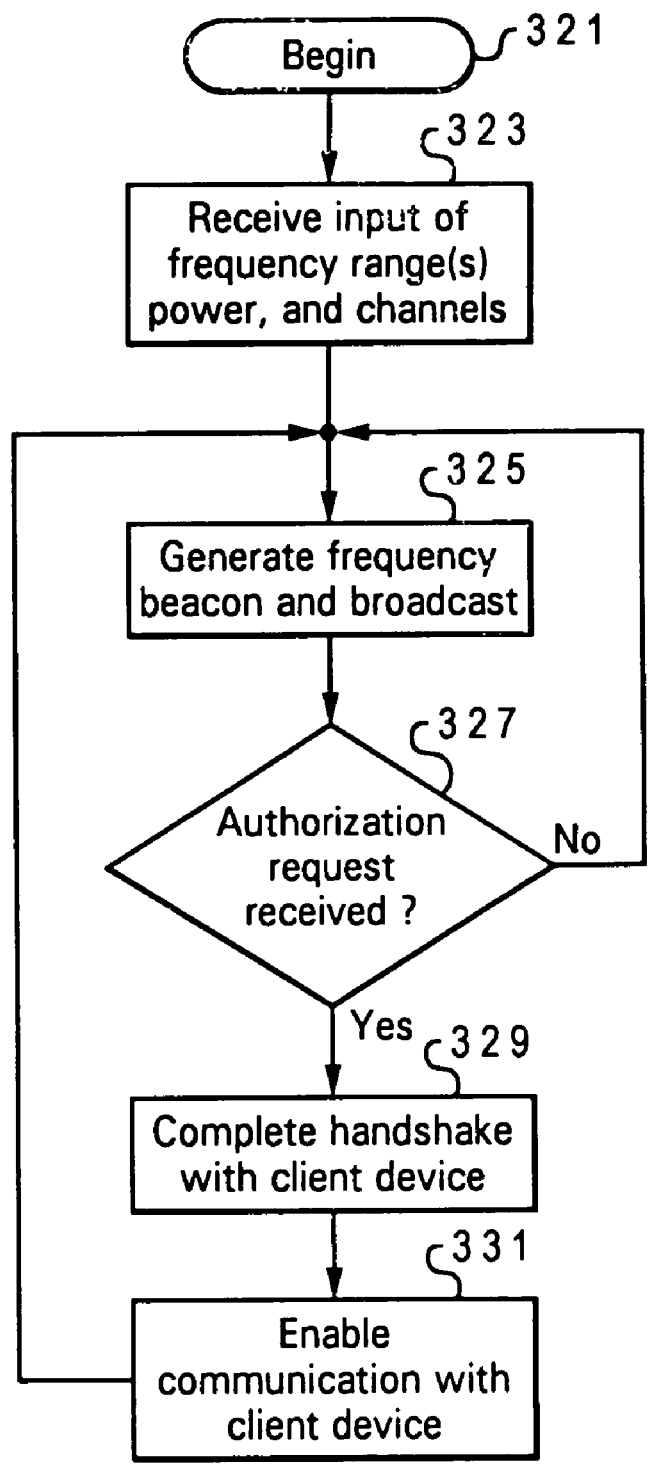
FIG. 3B is a flow chart illustrating the processes undertaken at the access device level to effectuate the features of the present invention.

FIG. 3B is a flow chart of the process by which the access point device is operated to provide the features of the invention. The process begins at block 321, and then proceeds to block 323, which indicates entry of the allowed frequency, power, and channel parameters by a system administrator. Since the input mechanism is available and the algorithm operates dynamically, the network administrator is able to update the parameters whenever the parameters are changed or adjusted. Following, the beacon generating algorithm 307 generates the beacon and broadcasts the beacon as shown at block 325. The access device monitors received signals to determine whether an authorization request has been received from a legal client device as indicated at block 327. Of course, since only legal client devices should transmit the authorization request, the illustrative embodiment assumes there is no need to check the legality of the device that issued the authorization request. The invention, however, may be extended to include this check because of the possibility that a client device may not be configured according to the device configuration provided within the invention, as described below.

Continuing with FIG. 3B, when the authorization request is received, the access device completes the handshake with the client device (as shown at block 329). The access device 24 then enables communication to the network by the client device as shown at block 331. The generation and broadcast of the frequency beacon continues on a periodic cycle to ensure that new client devices entering the geographic area are discovered.

Figure 4A:
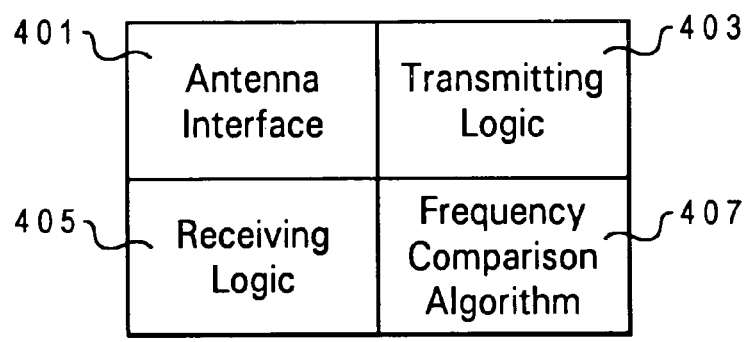
FIG. 4A illustrates the basic components of the mobile device of FIGS. 1 and 2 according to one embodiment of the present invention.

FIG. 4A illustrates one embodiment of the components of the mobile device 36 relevant to the implementation of the present invention. According to the illustrative embodiment, the mobile device 36 comprises conventional components including transmitting logic 403, receiving logic 405, and an antenna 401, which have been adapted to provide additional features required for the implementation of the invention. In the preferred embodiment, when the mobile device 36 enters an area covered by the network, the mobile device 36 operates as a receiver until communication with the network is established, i.e., it does not transmit a request for authorization on the airwaves unless it receives a beacon and determines itself to be a legal device. The mobile device 36 monitors the airwaves for receipt of a beacon. The mobile device 36 further includes a parameter comparison algorithm 407, which is utilized to determine if the mobile device 36 can operate with the frequencies, power levels, and channels indicated by the received beacon.

Figure 4B:
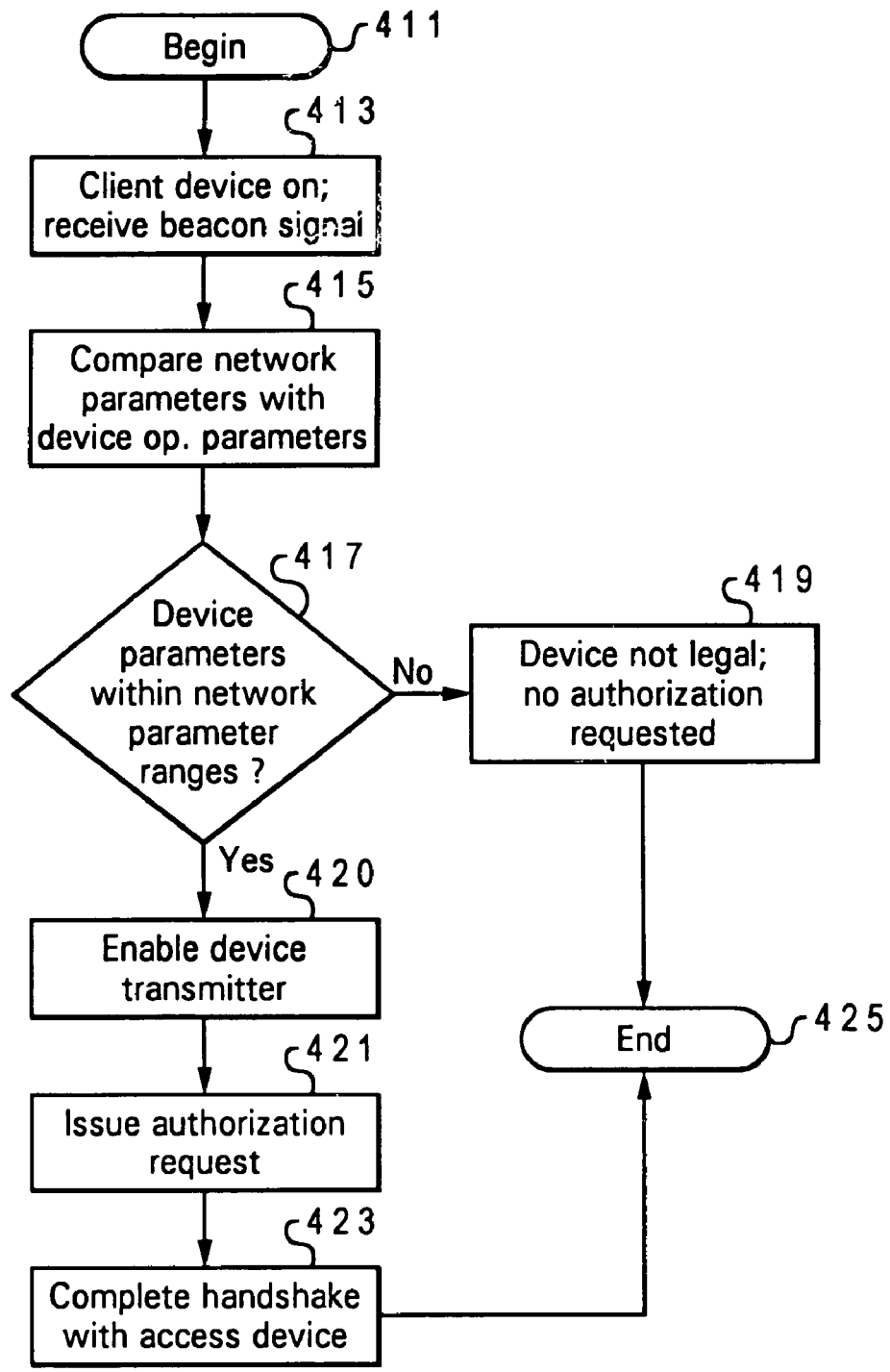
FIG. 4B is a flow chart illustrating the processes undertaken at the client device level to effectuate the network authentication and other features of the present invention.

FIG. 4B is a flow chart illustrating the processes undertaken by the mobile device 36 according to the invention. The process begins at block 411, and thereafter proceeds to block 413, which indicates the mobile device 36 being ON and receiving the beacon signal. Once received, the signal is evaluated to extract data about the frequencies supported by the network and the parameter comparison algorithm 407 compares the frequencies, power levels, and channels with those supported by the mobile device 36 as indicated at block 415. A determination is made at block 417 whether the mobile devices 36 operating parameters falls within those parameters supported by the network (i.e., whether the mobile device can legally operate within the network). If the frequency comparison algorithm 407 determines that the mobile device 36 can operate in the network, the transmitter is enabled as depicted in block 420 and the mobile device then requests authentication as shown at block 421. The mobile 36 device then completes a handshake with the access device, and the mobile device 36 is provided with access to the network as shown at block 423. The process then ends as shown at block 425. Returning to the decision block 417, if the mobile device 36 is not able to operate within the parameters of the network, the transmitter remains disabled, no authorization request is issued, and the mobile device 36 continues to operate only as a receiver.

The invention recognizes that with mobile products, mobile devices 36 are frequently transported in various power states (e.g., off, standby, hibernate, etc). Thus, in the illustrative embodiment, the mobile device 36 is programmed to reset its transmit mode to a receive mode anytime the mobile device 36 enters low power state. In this way, whenever power-on occurs, the mobile device 36 automatically enters the receive mode and waits on receipt of a beacon. Also, the transmit mode is automatically disabled when the device powers on from an off state or awakens from a sleep mode. In this way, transmission only truly occurs following the determination that the device is legal after receipt of a broadcasted beacon. The invention thus addresses the start-up of a mobile device 36 and changes the way the device is made operational.

The invention eliminates the need for the user to be aware of which countries are legal for a particular device. The access point discovers devices that are operating within the region. The invention further addresses enabling-disabling radio transmissions and handshakes between devices.

Figure 5A:
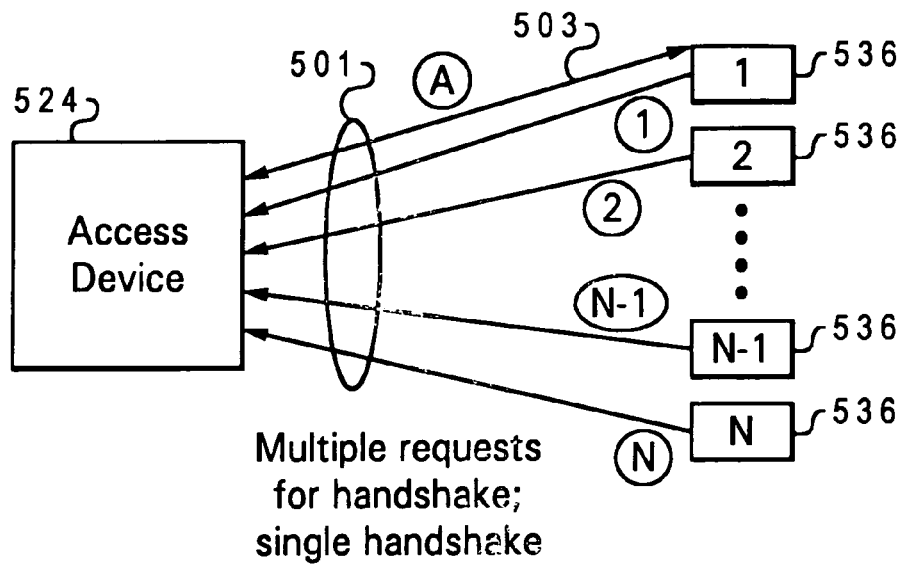
FIG. 5A illustrates the density of signals propagating on the airwaves for a wireless network operating according to convention networks.
Figure 5B:
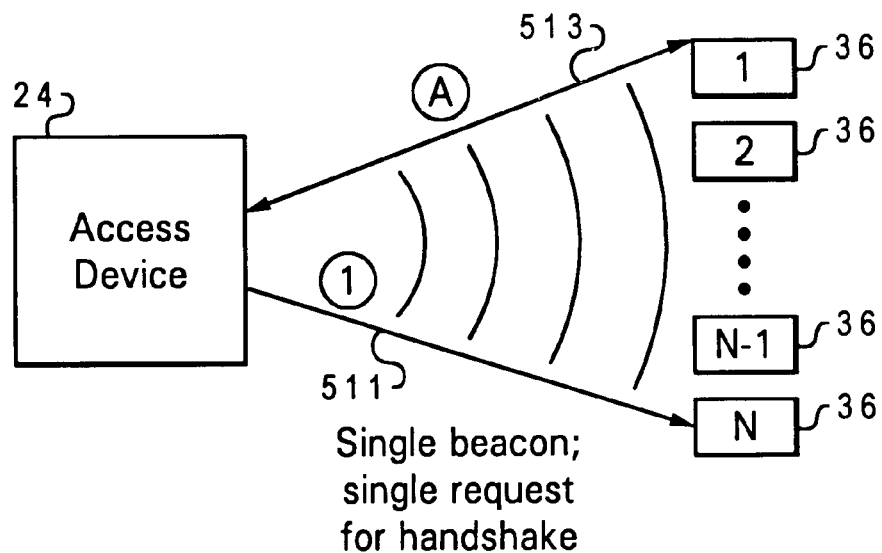
FIG. 5B illustrates the density of signals propagating on the airwaves for a wireless network operating according to one embodiment of the present invention.

Other benefits of the invention are clearly illustrated by FIGS. 5A and 5B, which depicts the number of signals being transmitted on the airwaves in a conventional system versus a system implementing the features of the invention. As shown in FIG. 5A, when N client devices 536*a* . . . *n* are located within (or are turned ON in or brought into) the network, each client device 536*a* . . . *n* generates and transmits authorization requests on the air waves. Thus, N signals 501, numbered 1 through N, are periodically propagated on the airwaves. Typically, less than all the client devices 536*a* . . . *n* are legal. For illustrative purposes, it is assumed that only one client device 536*a* is legal and all others are illegal. The N authorization requests results in the access device 524 issuing only one handshake to client device 536*a*. Thus N+1 signals are propagated on the airwaves, N–1 of which only clutter the airwaves and cause interference with other devices.

In contrast, the similar system operating according to the present invention generates only 2 signals on the airwaves. Since all the client devices 536*a* . . . *n* initially operate only as receivers, only the single beacon from the access device 24 is transmitted on the airwaves. As in the above illustration, client device 536*a* issues an authorization request and establishes communication with access device 24. The other N–1 client devices do not inhabit the airwaves with their illegal signals. Of course, more than a single handshake is expected to be completed within such a system, and the above example is provided only for illustrative purposes.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A wireless communication network comprising:
one or more network access devices configured to broadcast a network parameter beacon within said network, which network parameter beacon is a first transmission within a communication involving mobile devices entering into the network area and powering-on within the network, wherein said network parameter beacon comprises network parameters from among frequency ranges, power levels, and channels supported by said network; and
at least one mobile device configured with logic to (1) power on to a standby, receive-only operational mode, (2) monitor for receipt of a network parameter beacon being broadcasted within said network, (3) determine, based on information transmitted within said network parameter beacon, whether said mobile device is supported by said network, wherein, when the network parameter is a frequency range within which mobile device operation is supported, a handshake between the mobile device and an access device among the one of more network access devices is only initiated when a pre-set operating frequency of the mobile device falls within the frequency range provided by the network, (4) transition from the receive-only mode to an authentication mode when the device is supported by the network and initiate an authentication session with an access device among the one or more network access devices, (5) following an authentication of the mobile device, transition to a transmit-and-receive operational mode within the network, wherein the mobile device is able to complete general wireless communication within the network; and (6) enabling subsequent general wireless transmissions from the mobile device following the request for authentication only after the mobile device is authenticated;
wherein said subsequent general wireless transmissions are not enabled from the mobile device and the mobile device remains in the receive-only mode when either the mobile device is not supported by the network or the mobile device is not authenticated; and wherein said mobile device only transmits general wireless transmission within said network in response to receipt of the network parameter beacon and a determination that said mobile device is supported by said network followed by the authentication of the mobile device, wherein said determination includes comparing the network parameters within said beacon with pre-set network parameters within the mobile device that allow the mobile device to communicate within a network.

2. The wireless communication network of claim 1, wherein said mobile device comprises:
transmitting mechanism for communicating with said one or more network access device; and
logic means, upon receipt of said network parameter beacon and following an internal determination that the mobile device is supported by said network, for instantiating a handshake with the access device via said transmitting mechanism.

3. The wireless communication network of claim 2, wherein said instantiating includes requesting an authentication from said access devices.

4. The wireless communication network of claim 3, wherein said access devices further comprises a handshake response mechanism for responding to receipt of the request for authentication from the mobile device by establishing a communication path with said mobile device to allow said mobile device to communication within said network.

5. A method for authenticating client devices within a wireless communication network, said method comprising:
initially powering up said client device in a receive-only mode, such that said client device does not transmit wireless signals ont to the network;
receiving a broadcast of a network parameter beacon generated by one or more access devices of said network, wherein said network parameter beacon comprises network parameters from among frequency ranges, power levels, and channels supported by said said network;
evaluating said network parameter beacon for characteristics indicating whether said client device is one that has the correct operational parameters to transmit wireless communications within said network, wherein said client device operates in the receive-only mode until said client device determines it has the correct operational parameters to transmit wireless communications within the network; and
responsive to said client device having the correct operational parameters for wireless communications within said network, transmitting a request to said one or more access device for authentication of the client device to enable subsequent transmissions, wherein said client device only transmits requests for authentication after determining that the client device has the correct operational parameters;
wherein, when the network parameter is a frequency range within which mobile device operation is supported, a handshake between the mobile device and an access device among the one or more access devices is only initiated when a pre-set operating frequency of the mobile device falls within the frequency range provided by the network; and
enabling subsequent general wireless transmissions from the client device following the request for authentication only after the client device is authenticated, wherein said subsequent general wireless transmissions are not enabled from the client device and the client device remains in the receive-only mode when either the client device is not supported by the network or the client device is not authenticated.

6. The method of claim 5, further comprising monitoring airwaves for said network parameter beacon and restricting transmission within the network until after said beacon is received and an authentication handshake is completed between the mobile device and the access device.

7. The method of claim 5, wherein said beacon comprises parameter values of which frequency ranges, power levels, and channels are supported by said network, said evaluating step comprising:
comparing corresponding parameters supported by said network with parameters required for network transmissions of said client device; and
initiating an authentication communication with said one or more access devices only when a value of each operating parameter of said client device falls within said corresponding parameters supported by said network.

8. The method of claim 7, wherein said client device is set to the receive-only mode during regular power on and awake-from-sleep mode, said method further comprising resetting said client device to a non-transmit, receive-only mode when said client device enters a low power state, wherein said client device does not enter into said general wireless transmit mode following regular power on unless said client device determines that it is supported by said network following the receipt of said network parameter beacon.

9. A system for authenticating a client device within a wireless communication network, said system comprising:
means for initially powering up said client device in a receive-only mode, such that said client device does not transmit wireless signals out to the network;
a receiver that receives a broadcast of a network parameter beacon generated by one or more access devices of said network;
means for evaluating said beacon for characteristics indicating whether said client device is supported within said network, wherein said client device operates in the receive-only mode until said client device determines it has the correct operational parameters to transmit wireless communications within the network;
means, responsive to said client device being supported within said network, for placing the client device in an authentication mode from the receive-only mode and transmitting a request to said one or more access device for authentication of the client device to enable subsequent transmissions, wherein said client device only transmits requests for authentication after said evaluating means determines that the client device has the correct operational parameters; and
means for enabling subsequent general wireless transmissions following the request for authentication only after the client device is authenticated and removed from the authentication mode to a transmission mode;
wherein said subsequent general wireless transmissions are not enabled if the client device is not supported and authenticated enabled and the client device remains in the receive-only mode when the device is not supported by the network and returns to the receive-only mode when the authentication is not approved.

10. The system of claim 9, further comprising:
means for initially activating said client device in the receive-only mode;
monitoring means for monitoring airwaves for said network parameter beacon; and means for reconfiguring said client device to operate in both a transmit and a receive mode when the client device has operational parameters that are supported within the network.

11. The system of claim 9, wherein said network parameter beacon comprises parameter values of one or more of which frequency ranges, power levels, and channels are supported by said network, said evaluating means comprising:
means for comparing said one or more parameters values supported by said network with operational parameters of said client device; and
means for initiating a communication with said one or more access devices only when a value of each operating parameter of said client device thus within said one or more parameter values supported by said network.

12. The system of claim 11, wherein said client device is set to a receive-only mode during regular power on, said system further comprising means for resetting said client device to the receive-only mode when said client device enters a low power state, wherein said client device does not enter into said transmit mode following regular power on unless said client device determines that it is supported by said network following the receipt of said network parameter beacon.

13. The system of claim 9, further comprising means for generating and broadcasting said beacon utilizing an access device of said network.

14. The system of claim 13, further comprising: means for receiving a transmission of said request for authentication; and
means, responsive to said receipt, for completing said authentication of said client device.

15. The system of claim 14, further comprising means for enabling network access for a subsequent general wireless transmission with said client device following said authentication.

16. A client device for utilization within at least one of a plurality of wireless communication networks, said client device comprising:
means for dynamically entering a receive-only mode during regular power on of the client device, wherein said client device is initially enabled to only receive transmissions generated from within the wireless communication network; and
a receiver that receives a broadcast of a beacon generated by one or more access devices of said network;
means for evaluating said beacon for characteristics indicating whether operating parameters of said client device is supported within said network,
means, responsive to said client device being supported within said network, for automatically enabling an authentication-only transmit mode of the client device and transmitting a request to said one or more access device for authentication;
means for enabling subsequent general wireless transmissions following the request for authentication only after the client device is authenticated and removed from the authentication-only transmit mode to a full network access transmission mode;
wherein said subsequent general wireless transmissions are enabled while in the full network access transmission mode and said transmissions are not enabled if the client device is not authenticated, and the client device remains in the receive-only mode when the operating parameters of the client device are not supported by the network and returns to the receive-only mode when the authentication is not approved.

17. The client device of claim 16, further comprising monitoring means for monitoring airwaves for said beacon, wherein:
said beacon comprises a plurality of network parameters from among frequency ranges, power levels, and channels supported by said network; and
when the network parameter is a frequency range within which client device operation is supported, a handshake between the client device and one of the one or more network access devices is only initiated when a pre-set operating frequency of the client device falls within the frequency range supported by the network.

18. The client device of claim 17, wherein said beacon comprises information about device operating parameters supported by said network, said evaluating means comprising:
means for comparing values of said parameters supported by said network with operating parameters required for operation of said client device; and
means for initiating a communication with said one or more access device only when, a value of each of said operating parameters falls within said parameter values supported by said network.

19. The client device of claim 18, further comprising:
means for resetting said receiving mode to the receive-only mode when said client device enters a low power state.

20. The client device of claim 16, further comprising a transmitter and logic associated therewith, wherein said transmitter only transmits within said network following a determination that operating parameter values of said client device are within the parameter values supported by said network.

21. An access device of a wireless communication network, said access device comprising:
a transmitter;
means for broadcasting via said transmitter a network parameter beacon indicating characteristics of said network utilized by every client device desiring to access the network to determine whether a particular client device is supported by said network and comprises the required operating parameters required to transmit general wireless transmissions within the network wherein said client device is prevented from transmitting within the network until (a) the client device determines that it's operating parameters correspond to parameters supported by the network using the network parameter values transmitted within the network parameter beacon, and (b) the access device authenticates the particular client device via an authentication session initiated following a receipt of an authentication request from the particular client device, which authentication request is only transmitted from the particular client device when the particular client device completes a self-determination that it operates according utilizing operating parameters required to transmit general wireless transmissions within the network;
wherein said network parameter beacon comprises one or more network parameters from among frequency ranges, power levels, and channels supported by said network; and
wherein when the network parameter is a frequency range within which client device operation is supported, a handshake between the client device and a network access device is only initiated when a pre-set operating frequency of the client device falls within the frequency range supported by the network.

22. The access device of claim 21, further comprising means receiving data included within said beacon.

23. The access device of claim 21, further comprising means for generating said beacon with network specific operating parameter values.

24. The access device of claim 23, wherein said means for generating includes means for providing within said beacon information about which frequency ranges, power levels, and channels are supported by said network.

25. The access device of claim 23, wherein said means for generating said beacon includes means for broadcasting said beacon on a periodic basis.

26. The access device of claim 21, further comprising linking means for connecting to other components of said network.

27. The access device of claim 21, further comprising:

a receiver that receives transmissions of a request for authentication from one or more client devices located within said network; and means, responsive to said receipt for completing an authentication of said client device when said client device is supported by said network.

28. The access device of claim 27, further comprising means for enabling a general wireless communication with said client device when requested following said authentication of the client device.

* * * * *